(12) United States Patent
Dumora et al.

(10) Patent No.: US 9,409,296 B2
(45) Date of Patent: Aug. 9, 2016

(54) METHOD AND SYSTEM FOR ASSISTING IN ROBOT CONTROL, HAVING A FUNCTION FOR DETECTING THE INTENTION OF AN OPERATOR

(71) Applicant: COMMISSARIAT A L'ENERGIE ATOMIQUE ET AUX ENERGIES ALTERNATIVES, Paris (FR)

(72) Inventors: Julie Dumora, Merignac (FR); Franck Geffard, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/420,316

(22) PCT Filed: Jul. 29, 2013

(86) PCT No.: PCT/EP2013/065860
§ 371 (c)(1),
(2) Date: Feb. 6, 2015

(87) PCT Pub. No.: WO2014/023591
PCT Pub. Date: Feb. 13, 2014

(65) Prior Publication Data
US 2015/0224647 A1    Aug. 13, 2015

(30) Foreign Application Priority Data
Aug. 10, 2012   (FR) ...................... 12 57755

(51) Int. Cl.
*G06F 19/00*    (2011.01)
*B25J 9/16*     (2006.01)

(52) U.S. Cl.
CPC .............. *B25J 9/1679* (2013.01); *B25J 9/1633* (2013.01); *G05B 2219/36429* (2013.01); *G05B 2219/39439* (2013.01)

(58) Field of Classification Search
CPC .................. B25J 9/1679; B25J 9/1633; G05B 2219/36429; G05B 2219/39439; B66D 3/18; B66C 23/005; Y10S 901/09; Y10S 901/46
USPC .......................... 700/245, 258, 259; 901/9, 46
See application file for complete search history.

(56) References Cited

U.S. PATENT DOCUMENTS

| 5,385,508 | A | * | 1/1995 | Pietikainen | G01N 29/22 474/134 |
| 5,865,426 | A | * | 2/1999 | Kazerooni | B66D 3/18 212/285 |
| 6,204,620 | B1 | * | 3/2001 | McGee | B25J 9/1679 254/1 |

(Continued)

FOREIGN PATENT DOCUMENTS

| FR | 2962063 A1 | 1/2012 |
| FR | 2983762 A1 | 6/2013 |
| JP | 2008213119 A | 9/2008 |

*Primary Examiner* — Jason Holloway
*Assistant Examiner* — Rachid Bendidi
(74) *Attorney, Agent, or Firm* — Baker & Hostetler LLP

(57) ABSTRACT

A method for assisting in the control of a collaborative robot is provided, comprising a grasping member capable of holding a part at a grasping point, by an operator acting on control means disposed on the part at at least one holding point, the assistance method allowing the robot to execute a plurality of types of assistance, corresponding to a plurality of predetermined characteristic movements of the grasping member, comprises at least: a first step of detecting the intention of the operator determining the intention of the operator to execute a predetermined type of assistance from an analysis of haptic data of the operator; and a second step of determining the commands that the robot must execute as a function of the detected intention in order to provide the appropriate assistance.

15 Claims, 2 Drawing Sheets

(56) References Cited

U.S. PATENT DOCUMENTS

| | | | | |
|---|---|---|---|---|
| 6,522,952 B1 * | 2/2003 | Arai | B25J 9/1679 | 700/258 |
| 6,612,449 B1 * | 9/2003 | Otani | B25J 5/02 | 212/317 |
| 8,280,552 B2 * | 10/2012 | Takesue | B25J 13/02 | 700/260 |
| 2001/0005120 A1 | 6/2001 | Swanson et al. | | |
| 2009/0212478 A1 * | 8/2009 | Murayama | B25J 9/0018 | 269/56 |
| 2011/0040411 A1 | 2/2011 | Murayama et al. | | |
| 2013/0110290 A1 * | 5/2013 | Geffard | B25J 9/1679 | 700/258 |
| 2014/0324219 A1 * | 10/2014 | Dumora | B25J 9/1679 | 700/258 |

* cited by examiner

METHOD AND SYSTEM FOR ASSISTING IN ROBOT CONTROL, HAVING A FUNCTION FOR DETECTING THE INTENTION OF AN OPERATOR

CROSS-REFERENCE TO RELATED APPLICATIONS

This application is a National Stage of International patent application PCT/EP2013/065860, filed on Jul. 29, 2013, which claims priority to foreign French patent application No. FR 1257755, filed on Aug. 10, 2012, the disclosures of which are incorporated by reference in their entirety.

FIELD OF THE INVENTION

The present invention relates to a method for assisting in robot control, having a function for detecting the intention of an operator, and to a system for assisting in robot control implementing such a method. The present invention notably applies to the control of industrial robots dedicated to the movement and positioning of heavy and bulky loads, for which control means are remote with respect to a manipulator arm.

BACKGROUND

Industrial robots make it possible to move an object in space, according to a certain number of degrees of freedom of the latter. Such robots provide the movement of parts, typically very heavy or too bulky to be able to be moved by a human operator, for example on production lines. Such robots can also provide the precise positioning of these parts, for example in order to carry out assembly operations. As not all of the tasks carried out by industrial robots can be fully automated, some of them require a human operator to control them. Typically, an industrial robot is a system comprising a plurality of articulations, like a human arm. It can be in the form of a manipulator arm, equipped at one end with a grasping member able to grasp the part. The part can be spatially oriented by the robot, for example in rotation about three axes, and in translation along the aforesaid three axes; in any case the combined movements of the elements constituting the robot must allow manipulation of the part, making it possible to move and orient it in space.

In order to prioritize a precise manipulation of the part, the movements of the grasping member of the robot can be constrained so that involuntary movements of the operator do not deflect the manipulated part; for example the movements applied by the robot can be constrained in translation or in rotation. In such cases, it is said that the part is moved along "virtual guides", each forming a type of assistance to the operator. The present invention is included in the context of robots providing assistance like virtual guides.

There are various robot control systems. Notably, there are known control systems by means of which the operator can interact directly with the robot, for example by the intermediary of a control grip fixed at the level of the grasping member of the robot and allowing the operator to move the latter. In this way the part can be manipulated in its six degrees of freedom, it being possible to strictly compensate for the weight of the part. However, more particularly when the operator has to manipulate a part having large dimensions with precision, it can be difficult for him to control the robot solely by means of a control grip fixed at an end of the arm of the robot. Not only can it be essential for the operator to grasp a particular place on the part in order to be able to manipulate it in a certain way, but the fixed grip can also become out of reach to the operator when the robot has to grasp a single part having large dimensions.

In order to overcome these disadvantages, control systems have been designed allowing an operator to interact with a part to be manipulated by means of the part itself, by a control member remote from the robot and allowing a direct interaction with the part, located at an end of the part. Such a control system is described in the Japanese patent application published under the reference JP 2008/213119. In this control system, a grip remote from the robot can be disposed at a predetermined location on a frame supporting the part to be manipulated.

According to another technique, described in the patent application lodged under the reference FR 11/61402, control means can be fixed in a detachable manner by the operator at desired places on the part to be manipulated.

A disadvantage of systems in which the forces applied by the human operator are applied at a distance from the robot is related to the fact that the forces applied by the operator at the point of holding the part are different from the forces felt by the grasping member of the robot, which can involve ambiguities between different movements, for example the movements of rotation and of translation. For example, in a configuration where the operator and the grasping member of the robot grasp each end of a part, for example a board, the force felt at the level of the grasping member of the robot is like a torque, as though the operator wishes to pivot the part around the effector of the robot, even though he wishes to move it in translation. There is thus ambiguity with regard to the interpretation of the forces applied by the operator.

Solutions have been proposed to overcome these disadvantages. For example, in order to resolve a rotation/translation ambiguity, it is possible for the operator to apply a high torque about his holding point. However, by acting in such a way, the operator loses the advantage of the assistance provided by the robot because the application of a high torque forces him to apply a force on the part to be manipulated close to his holding point, but also close to the grasping member of the robot; in fact the operator must then apply a force in order to move the side of the part held by the robot in addition to the force applied in order to move his side of the part. Thus the robot becomes an additional constraint for the operator, who has to compensate for the moment of inertia generated by the length of the object to be manipulated and for the inertia of the robot.

According to more elaborate known techniques, starting with the hypothesis that the robot has no a priori knowledge of the tasks to be carried out and of the environment, the aforesaid disadvantage can be overcome by the definition of so-called "nonholonomic" constraints on the robot, making it possible to prohibit a movement of translation or a rotation of the manipulated object. Such techniques have the disadvantage of imposing tedious and non-intuitive efforts on the operator, for example a series of successive movements to impose on the part because of a prohibition of a movement of the manipulated object according to an unauthorized degree of freedom. It happens however that the fact of retaining the movement redundancies preserves the ability to allow the operator to carry out complex tasks rapidly and efficiently. Moreover, in more confined environments, the fact of preserving the holonomy of the possible movements ensures that this movement can be carried out, whatever the configuration may be, insofar as a path exists along which the part can be moved as desired. On the other hand, such a movement can be made impossible because of unauthorized movements in the context of methods involving nonholonomic constraints.

According to alternative known techniques, it has been proposed that the operator uses voice instructions in order to dictate his intentions to the robot and remove the possible ambiguities. Such techniques have the disadvantage of requiring complex voice recognition systems, which prove not to be very robust, notably in industrial environments that are often noisy. Moreover, such techniques introduce a significant delay between the making of a decision by the operator and the carrying out of the movement by the robot. Such techniques also have the disadvantage of not being universal: in fact the voice instructions must be recognized and notably given in a language recognized by the system. According to such techniques, the operator must also specify the reference system in which the instructions are given.

Thus, it is necessary for an assistance robot, notably for applications requiring the movement of bulky parts, to allow the holonomic movement of the part to be manipulated, whilst actively participating in the movements, in order that the operator does not have to apply forces that are too strong.

SUMMARY OF THE INVENTION

A purpose of the present invention is to overcome the disadvantages of the aforesaid known systems by proposing a method and a system for assisting in the control of a collaborative robot, making it possible to add new functionalities to the latter, in applications where the operator is remote with respect to the robot and in direct interaction with the manipulated part, by providing the operator, throughout the duration of the task that he has to carry out, with assistance in the manipulation which is adapted so that he applies minimum forces and so that the movements of the part are more precise.

An advantage of the invention is related to the fact that the operator is not explicitly required to control the robot using another channel, such as voice control; thus the operator can concentrate exclusively on the manipulation of the part. Moreover, the solution proposed by the present invention is universal in the sense that it does not depend, for example, on the language spoken by the operator.

Another advantage of the invention is that the number of movements of the part to be manipulated that can be carried out is not limited, not obliging the operator to combine different movements in order for the part to reach a position that only a movement prohibited by the robot would authorize for him. Thanks to the solution proposed by the present invention, the number of assistances to movement offered by the robot can be increased and the robot is allowed to adapt itself to the movements of the operator, contrary to the known solutions in which the operator is obliged to adapt himself to the movements authorized by the robot.

For this purpose, the invention relates to a method for assisting in the control of a robot, comprising a grasping member capable of holding a part to be manipulated at a grasping point, by an operator acting on the part at at least one holding point, the assistance method allowing the robot to execute a plurality of types of assistance corresponding to a plurality of predetermined characteristic movements of the grasping member, the method being characterized in that it at least comprises:

- a first step of detecting the intention of the operator to execute a type of assistance determined from among the plurality of types of assistance, from an analysis of a force torsor and of a kinematic torsor reduced at a specified point and from the knowledge of a current type of assistance executed by the robot;
- a second step of activation of an assistance that the robot must execute as a function of the intention detected in the first step, the second step retrieving control commands intended for the robot.

In one embodiment of the invention, the operator can act on the part using control means disposed on the part.

In one embodiment of the invention, the predetermined point of reduction of the force torsor and of the kinematic torsor can be situated at the level of the holding point.

In one embodiment of the invention, the assistance method can furthermore comprise a prior step comprising the definition of a plurality of movements of the part that can be carried out, the definition of the types of assistance required for the execution of the plurality of movements and the definition of controllers generating control commands to be applied for the execution of the defined types of assistance.

In one embodiment of the invention, said plurality of types of assistance can be a group comprising at least one of the types of assistance from among:

- a first type of assistance allowing the operator to carry out a movement of the side of the part held by the robot at the grasping point not coordinated with a movement of the side of the part held by the operator at the holding point without applying torque;
- a second type of assistance allowing the operator to carry out a movement of the side of the part held by the robot at the grasping point coordinated with a movement of the side of the part held by the operator at the holding point without applying torque;
- a third type of assistance allowing the operator to carry out a movement of rotation of the part;
- a fourth type of assistance allowing the operator to carry out a movement of the part in a straight line.

In one embodiment of the invention, the aforesaid first type of assistance can correspond to a movement of rotation of the part about a predetermined position of the holding point.

In one embodiment of the invention, the aforesaid second type of assistance can correspond to a movement of translation of the part according to which the orientation of the part remains parallel to an original position of the straight line passing through the holding point and the grasping point.

In one embodiment of the invention, the aforesaid third type of assistance can correspond to a rotation of the part about the grasping point.

In one embodiment of the invention, the aforesaid fourth type of assistance can correspond to a movement of translation of the part along the straight line passing through the holding point and the grasping point.

In one embodiment of the invention, the detection of intention carried out in the first step can be based on a comparative analysis of the values associated with the physical parameters contained in the force and kinematic torsors, the set of physical parameters contained in the two torsors whose characteristic values exceed the respective corresponding thresholds determining the intention of the operator, as a function of the current type of assistance in question, with reference to a reference database.

In one embodiment of the invention, the force and kinematic torsors can be established from measurements integrated over a timeslot of a predetermined duration.

The present invention also relates to a system for assisting in the control of a robot characterized in that it is configured to implement a control assistance method according to any one of the described embodiments.

In one embodiment of the invention, such an assistance system can comprise control means comprising at least a six-axis force sensor allowing the direct measurement of the reduced force torsor at the level of the holding point.

In one embodiment of the invention, the control means can be formed by a grip comprising fixing means capable of providing the fixing of the grip to the part.

In one embodiment of the invention, the control means can furthermore comprise an inertial system allowing the direct measurement of the reduced kinematic torsor at the level of the holding point.

BRIEF DESCRIPTION OF THE DRAWINGS

Other features and advantages of the invention will become apparent on reading the description, given by way of example, with reference to the appended drawings, in which.

DETAILED DESCRIPTION

Figure 1:
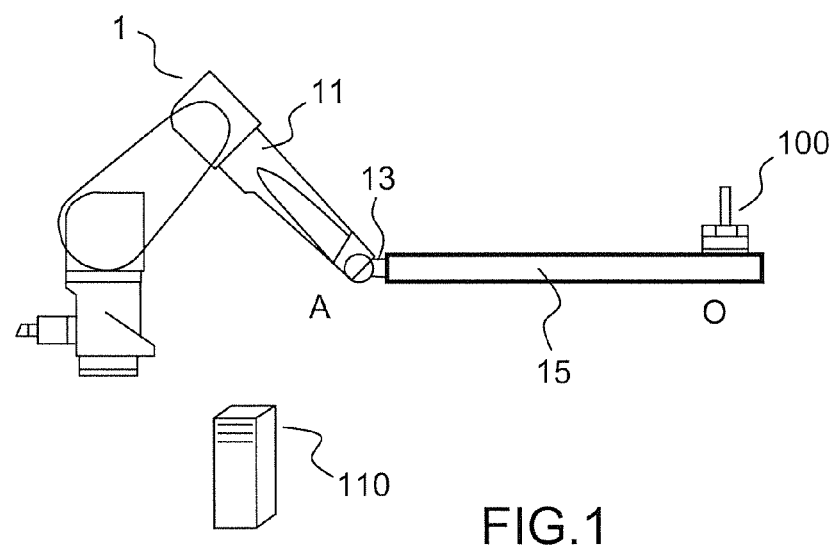
FIG. 1 shows a profile view illustrating a control system, according to one embodiment of the present invention.

FIG. 1 shows a robot 1, comprising for example a manipulator arm 11 at the end of which a force sensor can be disposed, for example according to six degrees of freedom, the sensor then being called a "six-axis sensor", not shown in the figure. A grasping member 13 is disposed at the end part of the manipulator arm 11. The grasping member 13 grasps a part 15 to be manipulated, at a grasping point A. Control means, formed by a grip 100 in the example illustrated by the figure, can be fixed to the part 15, at a holding point O. The grip 100 can be held by an operator, not shown in the figure, and can, according to the wishes of the latter, be disposed at a desired place on the part 15.

In the example illustrated by the figure, the part 15 to be manipulated is of an essentially flat shape, like a board, but it is understood that the present invention allows the manipulation of parts of various shapes, even complex ones.

Whilst holding the grip 100, the operator can for example impart on the part 15, by means of the grip 100, movements of displacement as they would be applied directly on the part, the function of the robot typically being to remove the sensation of the weight of the part for the operator.

A controller 110 can deliver control commands to the robot 1 and implement servo-control algorithms based on input data notably coming from sensors included in the control means and in the robot 1, as will be explained below. More generally, the controller 110 can implement a control method according to one of the embodiments of the invention. It is thus to be observed that the various steps of the method described below, notably involving the entering, acquisition and processing of data, can be implemented by means of the controller 110 or by different dedicated controllers.

A control system according to the present invention can furthermore comprise means of gathering the data described above and coming from sensors, these gathering means being able for example to be included in the controller 110.

The control system can comprise various sensors capable of gathering measurements of the forces applied at the level of the grasping member of the robot. Such sensors are usually added in irreversible or hardly reversible robots, widely represented in the field of industrial robots, having to evolve and be in contact with their environment, including with the operator.

It should be noted that the force sensor can for example be a multi-axis sensor situated at the level of the grasping member of the robot. It is also possible to dispose sensors at the level of the articulations of the robot, for example torque sensors; the measurements taken by these sensors can then make it possible to obtain the force measurements at the level of the grasping member of the robot. Measurements can also be obtained from measurements of supply currents of the motors of the articulations of the robot.

According to a specific feature of the present invention, the control means, that is to say the grip 100 in the example illustrated by the figure, comprise means for taking measurements of forces applied onto the latter.

FIGS. 2A, 2B, 2C and 2D show views diagrammatically illustrating different elementary movements of the part manipulated by the robot, for example such as the robot previously described with reference to FIG. 1.

For the sake of illustration, it is proposed hereafter to distinguish four types of elementary movements of the point A of grasping the part by the robot. Each of the four types of movements corresponds to a different assistance that the robot can provide. The straight line $(AO)_0$ passing through the holding point O and the grasping point A in the initial position of the part 15 to be manipulated can form a relevant reference for the breakdown of the assistances of the robot.

Figure 2A:
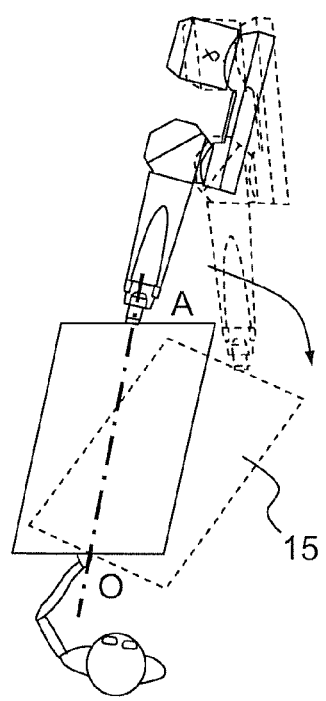
FIGS. 2A, 2B, 2C and 2D show views illustrating, in a diagrammatic manner, different elementary movements of the part manipulated by the robot.

A first type of assistance or virtual guide is illustrated by FIG. 2A and corresponds to a robot actively executing a movement different from that of the operator. Such a type of assistance can be denoted by the acronym UGTA standing for the English terminology "Uncoordinated Generative Torque Assistance". The example of UGTA illustrated by FIG. 2A corresponds to a rotation $R_O$ of the part 15 about a predetermined position of the point of holding by the operator.

Figure 2B:
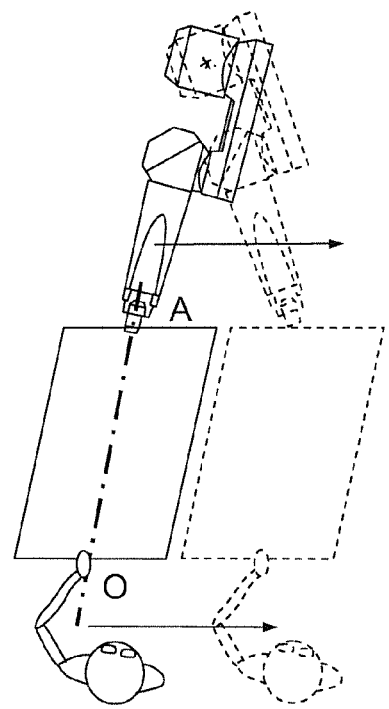

A second type of assistance is illustrated by FIG. 2B and corresponds to a robot whose movements actively follow the movements of the operator for the purpose of maintaining the orientation of the part 15 parallel with the straight line $(AO)_0$. Such a type of assistance can be denoted by the acronym CGTA standing for the English terminology "Coordinated Generative Torque Assistance". In the example illustrated by FIG. 2B, the CGTA corresponds to a virtual guide in a translation TY of the part, perpendicular to the straight line (AO).

The aforesaid first and second types of assistance UGTA and CGTA allow the operator to obtain a movement of the side of the part 15 most distant from him without having to apply a torque at the holding point O.

Figure 2C:
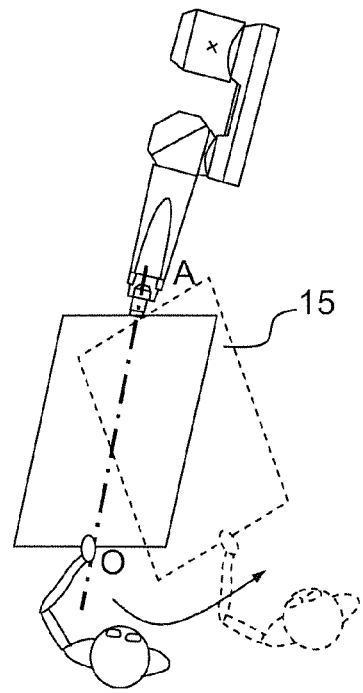

A third type of assistance is illustrated by FIG. 2C and corresponds to a robot movement maintaining the position of the grasping point A as being fixed, allowing the operator to pivot the part 15 about the grasping point A easily and intuitively. Such a type of assistance can be denoted by the acronym CGRA standing for the English terminology "Circular Generative Rail Assistance". The example of CGRA illustrated by FIG. 2C corresponds to a movement of rotation $R_A$ of the part about the grasping point A.

Figure 2D:
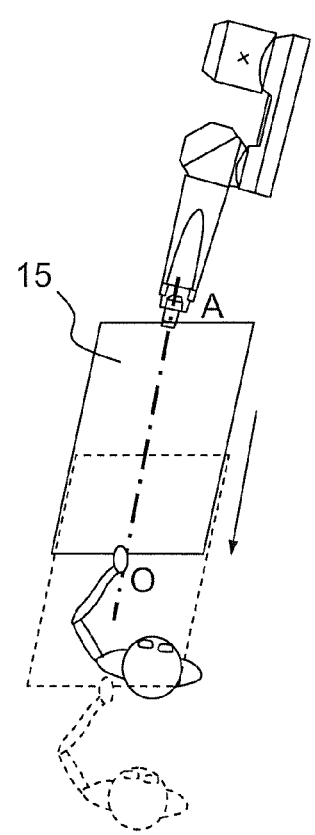

A fourth type of assistance is illustrated by FIG. 2D and corresponds to the movement of a robot following the movement of the operator along the straight line $(AO)_0$, thus retaining the orientation of the part 15 parallel with the straight line $(AO)_0$. Such a type of assistance can be denoted by the acronym SGRA standing for the English terminology "Straight Generative Rail Assistance". The example of SGRA illustrated by FIG. 2D corresponds to a virtual guide in translation $T_X$ in the direction of the straight line (AO).

Typically, at a given time, the robot is in the progress of executing a movement of one of the aforesaid four types and it is necessary that the intention of the operator to make the robot execute a movement of another type can be detected.

Figure 3:
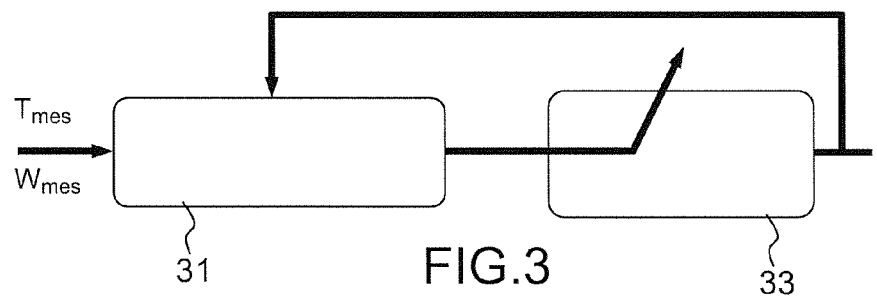
FIG. 3 shows a flowchart illustrating, in a diagrammatic manner, the principle of a method for assisting in the control of a robot according to an example embodiment of the invention.

With reference to FIG. 3, a method for detecting the intention of the operator 31 allows the retrieval of a variable representative of the intention of the operator. This intention variable is used by a method for assisting movement 33, applying a type of movement as a function of the intention variable. The hypothesis can be made that, if the current assistance provided by the robot is inappropriate, then the operator instinctively varies the forces applied to the control means in such a way as to compensate for the phenomenon.

According to the present invention, it is proposed that the detection of intention carried out by the intention detection method 31 is carried out taking account of the operator's haptic data, formed by a force torsor $T_{mes}$ and a kinematic or movement torsor $W_{mes}$, reduced at a predetermined point, for example at the operator's holding point.

For example, if the current assistance executed by the robot is of the CGRA type, the behavior of the robot is like that of a pivot. If the operator wishes to carry out a movement of rotation of the part $R_A$ about the holding point A, then the current assistance is the assistance appropriate to the case, and it can be considered that only very small forces can be measured at the level of the control means.

If the operator wishes to carry out a movement of translation of the part 15 according to the direction of the straight line (AO), that is to say an aforesaid movement of translation $T_X$, then he will apply a force along the direction x. The applied force can then be measured, the corresponding force in fact being transmitted to the connecting pivot of the grasping member of the robot.

If the operator wishes to carry out a movement of rotation $R_O$ of the part 15 about the holding point O, he will apply a torque $M_Z$. This torque can be measured, for example by means of a torque sensor disposed at the level of the control means.

If the operator wishes to carry out an aforesaid movement of translation $T_Y$, along the direction perpendicular to the straight line (AO), then he will apply a torque $M_Z$ and a force $F_Y$ in the direction y. In practice, the corresponding force y is not measured directly, the connecting pivot of the grasping member of the robot authorizing a speed $V_Y$ at the holding point O, according to Varignon's theorem. Thus, in practice, only the torque similar to the torque resulting from an intention of the operator to carry out a movement of rotation RO will be measured. However, a displacement $\Delta X_Y$ of the operator's hand in the direction y will also be measured if the operator wishes to carry out a movement of translation $T_Y$, whereas such a displacement cannot be measured in the case where the operator wishes to carry out a movement of rotation RO.

Thus, when the robot executes an assistance of a given type, it is possible to determine whether the intentions of the operator are to maintain the same assistance, or to change to assistance of an alternative type, by a measurement of the force applied at the level of the control means and of the displacement of the operator's hand. In other words, knowledge of the force torsor and of the kinematic torsor, these torsors being reduced at a predetermined point, for example situated at the level of the control means, makes it possible to detect the intentions of the operator.

For the example described above, in which the current assistance is of the CGRA type, the relationships between the intentions of the operator and the force torsor reduced at the holding point O can thus be formulated in the following first relationship table:

| Intention | $F_X$ | $F_Y$ | $M_Z$ |
|---|---|---|---|
| $R_A$ | 0 | 0 | 0 |
| $T_X$ | 1 | 0 | 0 |
| $R_O$ | 0 | Mz/L ≈ 0 where L is the length of the object | 1 |
| $T_Y$ | 0 | Mz/L ≈ 0 where L is the length of the object | 1 |

In the above first relationship table, the FIG. 1 denotes that the measured effort (force or torque) takes a value greater than a threshold value; L denotes the length of the part. Each parameter can be paired with a different threshold value, it being possible for each threshold value to be a predetermined value, or a value determined as a function of the position of the control means with respect to the grasping member of the robot, or more simply as a function of the distance between the holding point O and the grasping point A.

Similarly, the relationships between the intentions of the operator and the kinematic torsor reduced at the holding point O can be formulated in the following second relationship table:

| Intention | Displacement along y |
|---|---|
| $R_O$ | 0 |
| $T_Y$ | 1 |

The examples of relationship tables shown above relate to an example in which the current type of assistance executed by the robot is of the aforesaid CGRA type.

Similarly, relationship tables can be established for the configurations in which the current type of assistance executed by the robot is another of the aforesaid four types UCTA, CGTA, SGRA.

Thus, the knowledge of the current type of assistance executed by the robot, coupled with the knowledge of the force and kinematic torsors reduced at the point at which the operator holds the part 15, and the comparison of the values associated with the parameters of force, torque and speed that these torsors contain, make it possible to determine the intention of the operator to maintain the current type of assistance or to opt for an alternative type of assistance.

Figure 4:
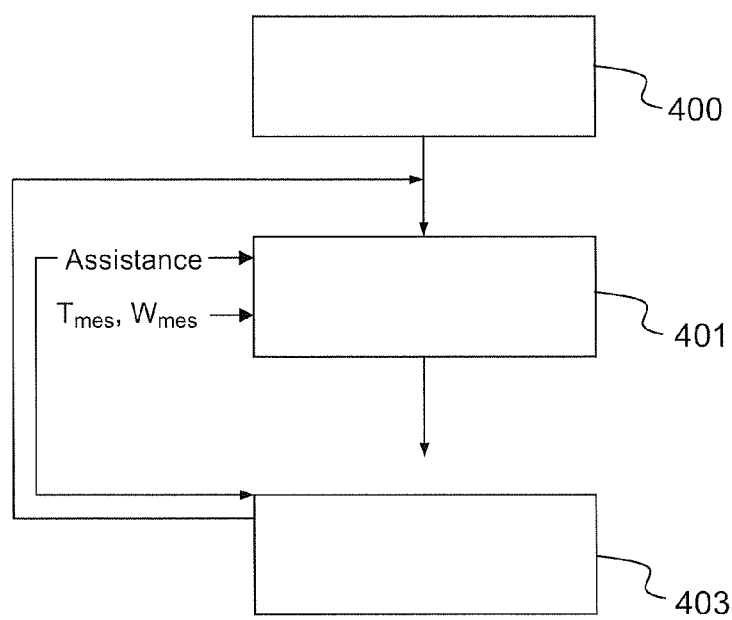
FIG. 4 shows a flowchart illustrating the steps of a method for assisting in the control of a robot according to an example embodiment of the invention.

FIG. 4, showing a flowchart illustrating the steps of a method for assisting with the control of a robot according to an example embodiment of the invention, provides an example of breakdown of a method for assisting the control of a robot into different successive steps.

A control assistance method can comprise a first step 401 of detection of the intention of the operator, followed by a second step 403 of activation of the type of assistance that the robot must execute. The determination of the intention of the operator carried out during the first step 401 is based on an analysis of the input data comprising the force torsor $T_{mes}$ reduced at the point of holding by the operator and the kinematic torsor $W_{mes}$ also reduced at the point of holding by the operator, also taking into account the current type of assistance executed by the robot. As previously described, the analysis of the input data can consist of a comparative analysis of the physical parameters contained in the two torsors, with specified threshold values. The set of physical parameters contained in the two torsors, whose characteristic values exceed their respective corresponding thresholds, determines the intention of the operator, as a function of the current type of assistance in question. The association of a type of assistance with a set of physical parameters can be defined in a reference database.

Advantageously, if the characteristic values of the measured physical parameters exceed the specified threshold values corresponding to them over at least one specified time period, then and only then can these measurements be considered as significant and taken into consideration by a method according to the present invention. This embodiment has the advantage of providing more robust measurements.

Advantageously, the specified time period can be chosen to be of the order of a few tens of milliseconds, for example 100 ms or a value substantially equal to 100 ms, in order to provide the measurements simultaneously with satisfactory robustness and dynamic range.

It should be observed that any other signal recognition algorithm can advantageously be used instead and in place of the thresholds.

When the intention of the operator is determined during the first step 401, a variable representative of the intention of the operator can constitute the input data of the second step 403, generating the control commands for the robot, as a function of the variable representative of the intention of the operator.

The force and kinematic torsors reduced at the level of the holding point can be made available and updated in real time, for example by being determined on a periodic basis at a high frequency.

The aforesaid first and second steps 401, 403 can be preceded by a prior step 400, during which the movements of the object that it can be desirable to carry out are defined. This definition comprises for example the indication that certain movements are authorized or prohibited, or that certain sequences of different movements are authorized or prohibited. This definition can be predefined, or can be carried out by the operator prior to the manipulations, using appropriate input means.

The prior step 400 also comprises the definition of the types of assistance provided by the robot and which the operator needs for the execution of the movements thus defined.

The prior step 400 also comprises the definition of the controllers generating the control commands to be sent to the robot for the execution of the necessary types of assistance.

It should be observed that the implementation of a control assistance method according to the present invention requires the knowledge of the force and kinematic torsors reduced at the holding point of the part to be manipulated by the operator. In practice, the force torsor reduced at the holding point can be measured directly by a six-axis sensor. This sensor can for example be disposed on a detachable grip that the user places at the desired place on the part to be manipulated, as described in the aforesaid patent, lodged under the reference FR 11/61402.

All types of sensors can be used, these sensors making it possible to retrieve a force torsor and make it available at another place, with the reservation that the torsor reduced at the operator's holding point can be determined. Sensors distant from the control means can notably be envisaged, for example if locating means make it possible to determine the location of the control means. The locating means can for example comprise an inertial system, or optical means associated with appropriate processing means. In such cases, it can also be envisaged that no physical means of control are used, or more precisely that the means of control of the part to be manipulated are formed by the hand or the hands of the operator: the operator can for example apply his hand directly on the part to be manipulated, with adequate means of locating the operator's hand, associated with remote measuring means, making it possible to determine the force torsor reduced at the level of the operator's hand.

It should also be observed that the examples described above mention control means formed by a grip, but that other control means can be envisaged, such as gloves comprising appropriate sensors. Moreover, the examples described apply to control means disposed at one point on the part to be manipulated, but it can also be envisaged that the control means are in practice disposed at a plurality of points on the part to be manipulated, the operator then being capable, for example, of manipulating the part using both of his hands. In such a case, the force and kinematic torsors can be reduced at a specified point, for example situated at the level of one of the control means.

The invention claimed is:

1. A method for assisting in the control of a robot, comprising a grasping member capable of holding a part to be manipulated at a grasping point, by an operator acting on the part at at least one holding point, the assistance method allowing the robot to execute a plurality of types of assistance corresponding to a plurality of predetermined characteristic movements of the grasping member, the method comprising:
   a first step of measuring or estimating a force torsor applied by the operator to the part and a kinematic torsor,
   a second step of determining a type of assistance intended by the operator, from among the plurality of types of assistance, based on the analysis of the force torsor and the kinematic torsor reduced at a specified point and the knowledge of a current type of assistance executed by the robot;
   a third step of activation of the assistance determined in the second step, that the robot must execute, the third step retrieving control commands intended for the robot.

2. The control assistance method of claim 1, wherein the operator acts on the part using control means disposed on the part.

3. The control assistance method of claim 1, wherein a point of reduction of the kinematic torsor is situated at the level of the holding point.

4. The control assistance method of claim 1, further comprising a prior step comprising the definition of a plurality of movements of the part that can be carried out, the definition of the types of assistance required for the execution of the plurality of movements and the definition of controllers generating control commands to be applied for the execution of the defined types of assistance.

5. The control assistance method of claim 1, wherein said plurality of types of assistance is a group comprising at least one of the types of assistance from among:
   a first type of assistance allowing the operator to carry out a movement of the side of the part held by the robot at the grasping point not coordinated with a movement of the side of the part held by the operator at the holding point without applying torque;
   a second type of assistance allowing the operator to carry out a movement of the side of the part held by the robot at the grasping point coordinated with a movement of the side of the part held by the operator at the holding point without applying torque;
   a third type of assistance allowing the operator to carry out a movement of rotation of the part;
   a fourth type of assistance allowing the operator to carry out a movement of the part in a straight line.

6. The control assistance method of claim 5, wherein the first type of assistance corresponds to a movement of rotation of the part about a predetermined position of the holding point.

7. The control assistance method of claim 5, wherein the second type of assistance corresponds to a movement of translation of the part according to which the orientation of the part remains parallel to an original position of the straight line passing through the holding point and the grasping point.

8. The control assistance method of claim 5, wherein the third type of assistance corresponds to a rotation of the part about the grasping point.

9. The control assistance method of claim 5, wherein the fourth type of assistance corresponds to a movement of translation of the part along the straight line passing through the holding point and the grasping point.

10. The control assistance method of claim 1, wherein determining a type of assistance intended by the operator is based on a comparative analysis of the values associated with the physical parameters contained in the force and kinematic torsors, the set of physical parameters contained in the two torsors, whose characteristic values exceed the respective corresponding thresholds determining the intention of the operator, as a function of the current type of assistance in question, with reference to a reference database.

11. The control assistance method of claim 10, wherein the force and kinematic torsors are established from measurements integrated over a timeslot of a predetermined duration.

12. A system for assisting in the control of a robot comprising a grasping member capable of holding a part to be manipulated at a grasping point, by an operator acting on the part at at least one holding point, the assistance method allowing the robot to execute a plurality of types of assistance corresponding to a plurality of predetermined characteristic movements of the grasping member, the system being configured to implement:
   a first step of measuring or estimating a force torsor applied by the operator to the part and a kinematic torsor,
   a second step of determining a type of assistance intended by the operator, from among the plurality of types of assistance, based on the analysis of the force torsor and the kinematic torsor reduced at a specified point and the knowledge of a current type of assistance executed by the robot;
   a third step of activation of the assistance determined in the second step, that the robot must execute, the third step retrieving control commands intended for the robot.

13. The system of claim 12, further comprising a controller comprising at least a six-axis force sensor allowing the direct measurement of the reduced force torsor at the level of the holding point.

14. The system of claim 13, wherein the controller is formed by a grip comprising fixing means capable of providing the fixing of the grip to the part.

15. The system of claim 13, wherein the controller can furthermore comprise an inertial system allowing the direct measurement of the kinematic torsor at the level of the holding point.

* * * * *